(12) United States Patent  
Lazarini et al.

(10) Patent No.: US 9,807,570 B1  
(45) Date of Patent: Oct. 31, 2017

(54) SYSTEMS AND METHODS FOR DETECTING PROXIMITY AND LOCATION OF A SMARTPHONE OR OTHER DEVICE TO A VEHICLE

(71) Applicant: GM Global Technology Operations LLC, Detroit, MI (US)

(72) Inventors: Marcelo V. Lazarini, Macomb, MI (US); Roddi L. Macinnes, Ontario (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/190,349

(22) Filed: Jun. 23, 2016

Related U.S. Application Data

(60) Provisional application No. 62/343,885, filed on Jun. 1, 2016.

(51) Int. Cl.
```
H04W 4/04      (2009.01)
H04W 4/00      (2009.01)
G01S 5/02      (2010.01)
```
(52) U.S. Cl.  
CPC ........... *H04W 4/046* (2013.01); *G01S 5/0252* (2013.01); *H04W 4/008* (2013.01)

(58) Field of Classification Search  
None  
See application file for complete search history.

(56) References Cited

U.S. PATENT DOCUMENTS

| | | | |
|---|---|---|---|
| 2013/0298208 A1* | 11/2013 | Ayed | G06F 21/00 726/6 |
| 2015/0087241 A1* | 3/2015 | Van Wiemeersch | H04K 3/22 455/67.13 |
| 2015/0172934 A1* | 6/2015 | Engelien-Lopes | H04W 84/20 370/252 |
| 2015/0358780 A1* | 12/2015 | Saari | H04W 4/008 370/252 |

* cited by examiner

*Primary Examiner* — Diane Mizrahi (57) ABSTRACT

A remote keyless system for a vehicle includes a plurality of slave transmitter modules arranged in a plurality of locations in the vehicle. A master transceiver module is configured to pair with a wireless device; wirelessly transmit data to and receive data from the wireless device; transmit first wired messages to the plurality of slave transmitter modules to send first wireless messages to the wireless device; receive a plurality of second wireless messages directly from the wireless device, wherein the second wireless messages comprise data including received signal strength indicators (RSSIs) corresponding to each of the plurality of slave transmitter modules, respectively; and determine a location of the wireless device relative to the vehicle based on the RSSIs in the plurality of second wireless messages.

20 Claims, 7 Drawing Sheets

SYSTEMS AND METHODS FOR DETECTING PROXIMITY AND LOCATION OF A SMARTPHONE OR OTHER DEVICE TO A VEHICLE

CROSS-REFERENCE TO RELATED APPLICATIONS

This application claims the benefit of U.S. Provisional Application No. 62/343,885, filed on Jun. 1, 2016. The entire disclosure of the application referenced above is incorporated herein by reference.

FIELD

The present disclosure relates to systems and methods for detecting proximity and location of a smartphone or other device to a vehicle.

INTRODUCTION

The introduction provided here is for the purpose of generally presenting the context of the disclosure. Work of the presently named inventors, to the extent it is described in this introduction section as well as other aspects of the description are neither expressly nor impliedly admitted as prior art against the present disclosure.

Remote keyless systems may be used to actuate electronic locks that control access to a vehicle without using a traditional mechanical key. Remote keyless systems may perform the function of a mechanical key without requiring physical contact. When the key fob or smartphone is within a few yards of the vehicle, pressing a button on the keyfob or smartphone or touching a vehicle door either locks or unlocks the vehicle doors.

SUMMARY

A remote keyless system for a vehicle includes a plurality of slave transmitter modules arranged in a plurality of locations in the vehicle. A master transceiver module is configured to pair with a wireless device; wirelessly transmit data to and receive data from the wireless device; transmit first wired messages to the plurality of slave transmitter modules to send first wireless messages to the wireless device; receive a plurality of second wireless messages directly from the wireless device, wherein the second wireless messages comprise data including received signal strength indicators (RSSIs) corresponding to each of the plurality of slave transmitter modules, respectively; and determine a location of the wireless device relative to the vehicle based on the RSSIs in the plurality of second wireless messages.

In other features, the master transceiver module includes a wireless transceiver executing a wireless protocol. The master transceiver module includes a wireless transceiver executing a Bluetooth low energy (BLE) stack. The wireless transceiver transmits BLE compliant messages to the wireless device and receives BLE messages from the wireless device. The master transceiver module is connected to a vehicle communication bus. The vehicle communication bus comprises at least one of a local interconnect network (LIN) bus and a controller area network (CAN) bus.

In other features, the master transceiver module includes a wired bus transceiver that communicates with the plurality of slave transceiver modules; a master controller in communication with the wired bus transceiver; a wireless transceiver in communication with the master controller; memory connected to the wireless transceiver; and a transceiver output circuit connected to the wireless transceiver.

In other features, the transceiver output circuit includes a balun connected to an output of the wireless transceiver; a filter directly connected to the balun; and an antenna directly connected to the filter.

In other features, the slave transmitter module includes a wired bus transceiver that communicates with the master transceiver module; a master controller in communication with the bus transceiver; a transmitter in communication with the master controller; and a transmitter output circuit.

In other features, the transmitter output circuit includes a balun connected to an output of the transmitter; and an antenna directly connected to the balun.

In other features, the master transceiver module sequentially transmits the first wired messages on the vehicle communication bus to the plurality of slave transmitter modules. The first wired messages transmitted by the master transceiver module to the plurality of slave transmitter modules include security data. The security data includes a key and identification data for one of the plurality of slave transmitter modules.

In other features, the first wired messages transmitted by the master transceiver module to the plurality of slave transmitter modules include channel data specifying a channel to be used by the corresponding one of the plurality of slave transmitter modules. The wireless device comprises a smartphone executing an application.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Remote keyless systems typically include a transceiver that wirelessly communicates with a key fob, smartphone or other device. Remote keyless systems may be used to perform other functions such as starting the ignition, remotely starting an engine of the vehicle or opening a trunk or lift gate.

Figure 1:
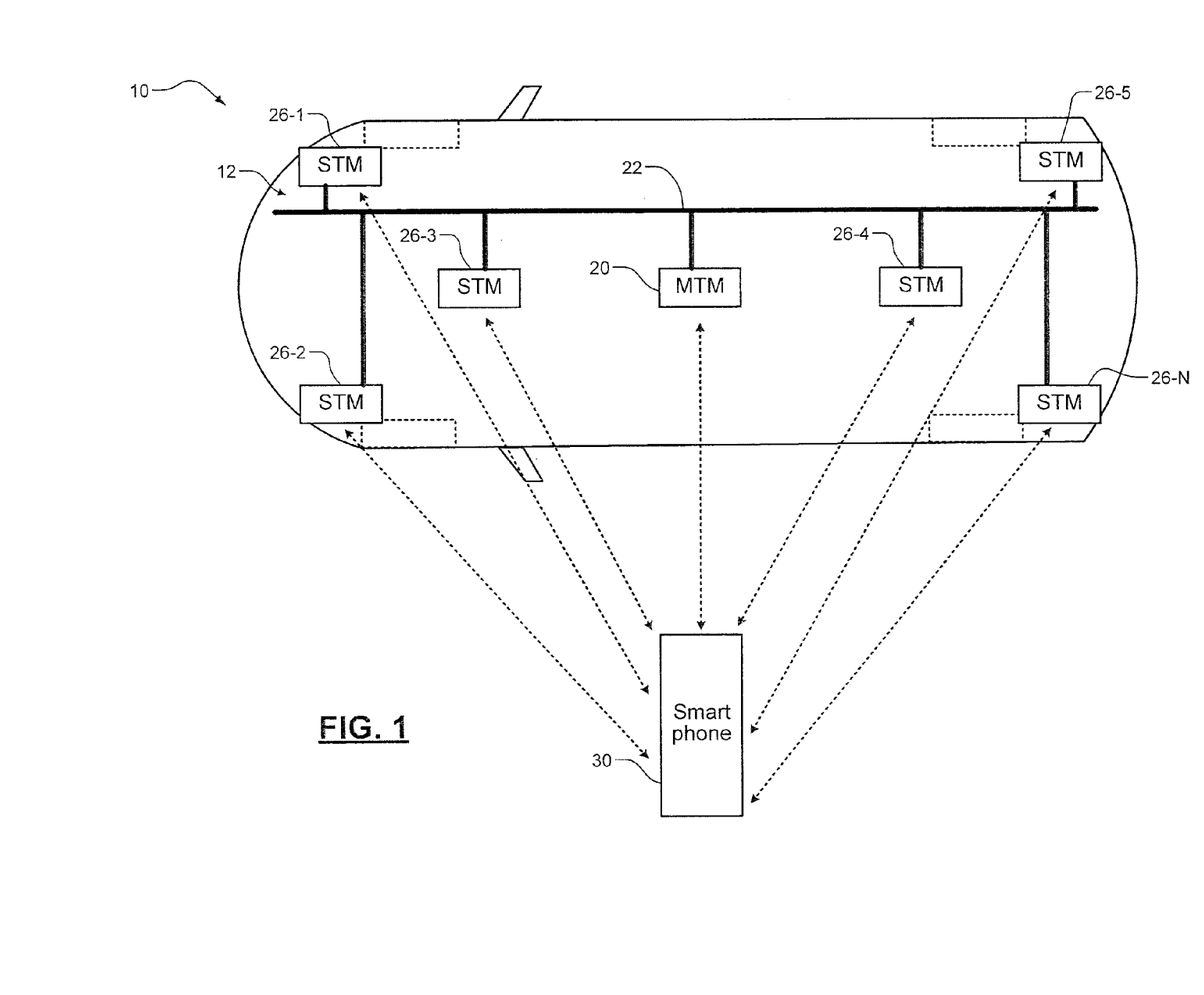
FIG. 1 is a functional block diagram of an example of a vehicle including a remote keyless system that wirelessly communicates with a smartphone.

Referring now to FIG. 1, a vehicle 10 includes a remote keyless system 12 for controlling door entry, ignition and/or other functions. The remote keyless system 12 includes a master transceiver module (MTM) 20 that communicates with a vehicle communication bus 22. The MTM 20 includes a wireless transceiver compatible with Bluetooth low energy (BLE), Wi-Fi or other wireless or smartphone protocol. The MTM 20 pairs with the smartphone 30, transmits data to the smartphone 30 and receives data from the smartphone 30.

The remote keyless system 12 further includes a plurality of slave transceiver modules (STMs) 26-1, 26-2, 26-3, . . . , and 26-N (collectively STMs 26), where N is an integer greater than 1. The STMs 26 include a BLE transceiver. The STMs 26 transmit data to the smartphone 30 and receive data from the smartphone 30.

As can be seen in FIG. 1, the STMs 26 are arranged in different locations of the vehicle 10. For example, STMs 26-1 and 26-2 are arranged at opposite sides in the front of the vehicle 10, STMs 26-5 and 26-N are arranged at opposite sides in the rear of the vehicle 10, and STMs 26-3 and 26-4 are arranged at front-middle and rear-middle portions of the vehicle 10.

A smartphone 30 is paired with the vehicle by a user using a traditional pairing process or an application on the smartphone 30. The pairing can be manual or automatic (when the smartphone 30 includes an application that performs automatic pairing). Typically the manual pairing process includes triggering a pairing mode using vehicle and/or smartphone interfaces and selecting the vehicle on the smartphone 30 interface (or vice versa). Some pairing processes may further require the use of a password or key to be entered into the vehicle 10 or smartphone 30 or retrieved from an online server.

The MTM 20 advertises a connection. When the smartphone 30 is within a predetermined distance from the vehicle 10, the smartphone 30 pairs with the MTM 20 and a connection is established. To identify a zone (or location and proximity) of the smartphone 30 relative to the vehicle 10, the MTM 20 sends a message via the vehicle bus 22 to the STMs 26. The message instructs the STMs 26 to transmit a message to the smartphone 30, receive a return message from the smartphone 30 including a receive signal strength indicator (RSSI) and forward the RSSI for the MTM 20 via the vehicle bus 22. Alternately, the STMs 26 can pair with the smartphone 30 in the same manner as the MTM 20.

In other words, the response from the smartphone 30 is transmitted to the respective one of the STMs 26 that generated original message. After the MTM 20 receives the responses from all of the STMs 26, the MTM 20 determines the zone (or the location and proximity) of the smartphone 30 relative to the vehicle 10 based on the RSSIs.

Figure 2:
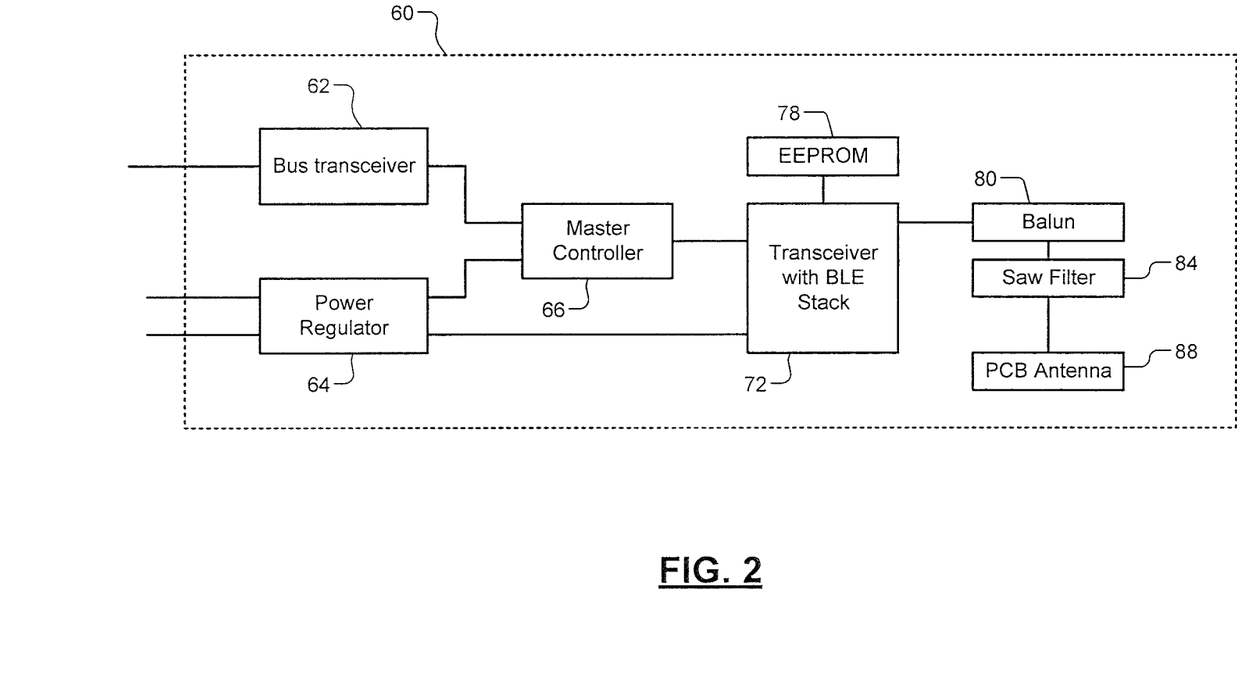
FIG. 2 is a functional block diagram of an example of an architecture that may be used for a master transceiver module (MTM) and/or slave transceiver modules (STMs) in FIG. 1.

Referring now to FIG. 2, an example of a circuit 60 that may be used to transmit data to and receive data from the smartphone 30 is shown. The architecture of the circuit 60 may be used for both the MTM 20 and the STMs 26.

The circuit 60 includes a bus transceiver 62 which is a wired transceiver that communicates with the vehicle bus 22. The vehicle bus 22 includes a local interconnect network (LIN) bus, a controller area network (CAN) bus or other type of bus. The circuit 60 further includes a power regulator 64 that regulates power from a vehicle power bus and provides a predetermined voltage and/or current signal to the other devices.

Messages may be transmitted to and received from the MTM 20 via the vehicle bus 22, individual buses or combinations thereof. The bus transceiver 62 provides an interface between devices in the circuit 60 and the vehicle bus 22. An output of the bus transceiver 62 is input to a master controller 66. The master controller 66 of the MTM 20 is configured to generate and transmit the messages to the STMs 26 and receive the messages including the RSSIs from the STMs 26.

The master controller 66 communicates with a wireless transceiver 72 that provides a wireless interface to the smartphone 130. In addition, the master controller 66 of the MTM 20 calculates the location of the smartphone 30 based on the RSSIs from the STMs 26 as described above. The wireless transceiver 72 transmits data to the smartphone 30 and receives data from the smartphone 30 via a transceiver output circuit including a balun 80, a saw filter 84 and an antenna 88. Components of the circuit 60 may be mounted on a printed circuit board (PCB). Memory 78 such as random access memory (RAM), read-only memory (ROM), electronically erasable and programmable ROM (EEPROM), etc. may be provided to store data for the master controller 66 and/or wireless transceiver 72.

As can be appreciated, the cost of the system in FIGS. 1 and 2 is relatively high due to the fact that the MTM 20 and the STMs 26 are fully functioning BLE-enabled devices. In the example in FIG. 1, seven separate BLE transceivers are used. Systems and methods according to the present disclosure include slave transmitter modules (STs) rather than slave transceiver modules (STMs). The STs do not require BLE-enabled receivers and therefore can have a simplified architecture, which reduces system cost. In other words, the slave transmitter modules may be configured so that they are only capable of transmitting wireless messages and do not have a wireless receiver or wireless receiving capability, which may reduce cost.

Figure 3:
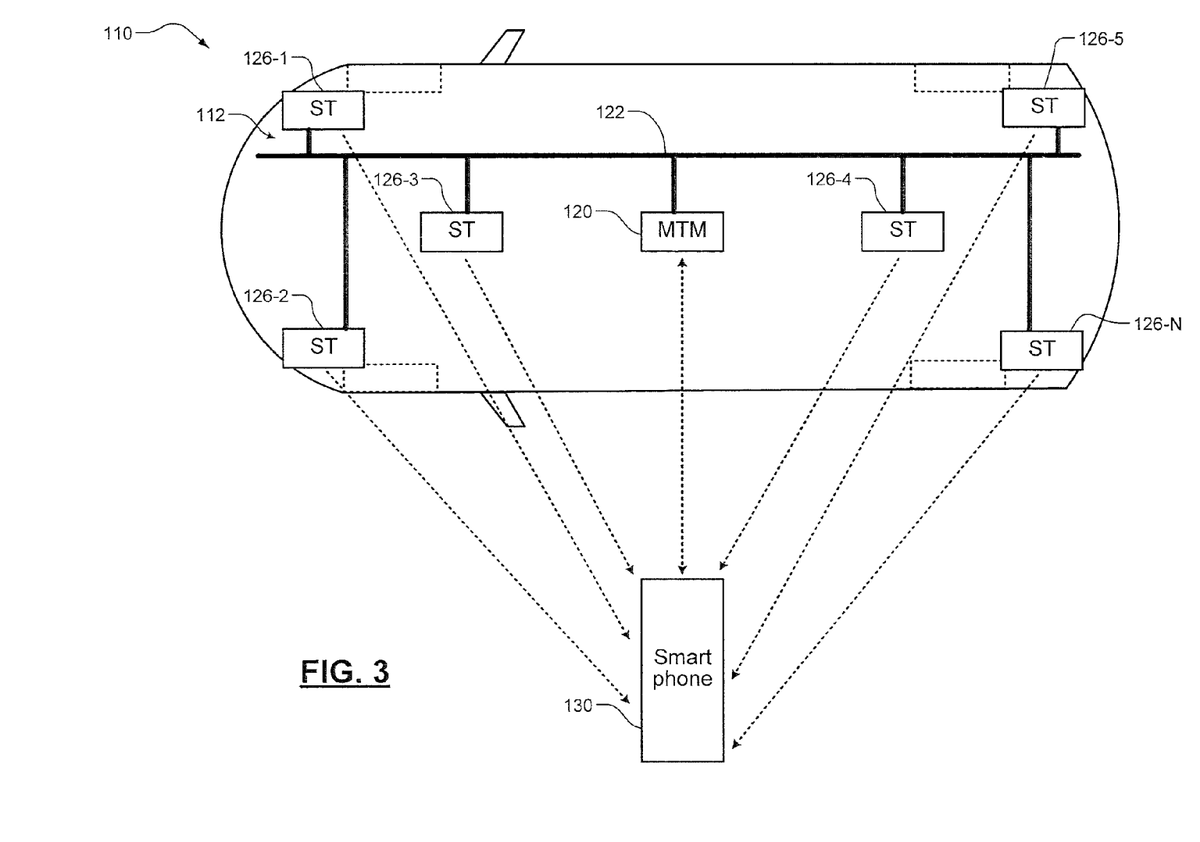
FIG. 3 is a functional block diagram of an example of a vehicle including a remote keyless system according to the present disclosure that communicates with a smartphone.
Figure 4:
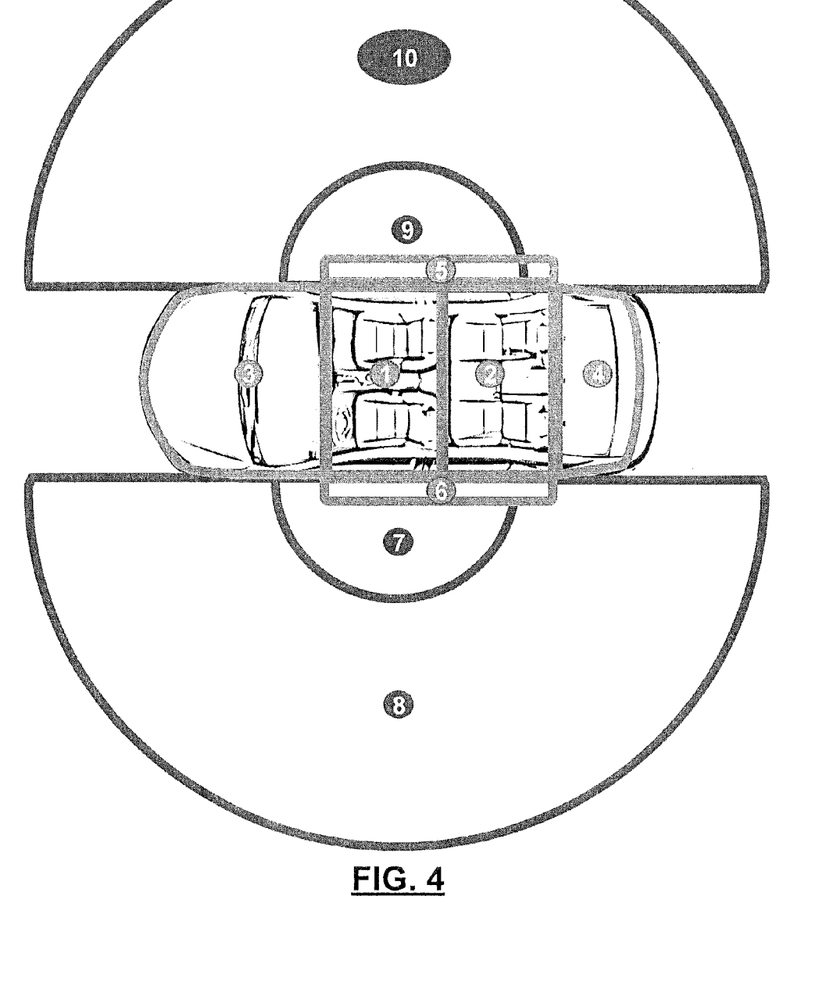
FIG. 4 illustrates an example of zones around the vehicle.

Referring now to FIGS. 3-4, a remote keyless system 112 identifies a location of a smartphone 130 relative to different zones around a vehicle 110. In FIG. 3, the remote keyless system 112 includes one or more master transceiver modules (MTM) 120 that are connected to a vehicle communication bus 122. While a single MTM 120 is shown, additional MTMs may be used to improve range or provide simultaneous connections. The MTM 120 includes both wired and wireless transceivers as will be described further below. In some examples, the MTM 120 includes a Bluetooth low energy (BLE) transceiver, a Wi-Fi transceiver or a transceiver using another wireless or smartphone protocol.

The MTM 120 may selectively wake up or shut down the vehicle communication bus 122 as needed to reduce power consumption. In some examples, the vehicle communication bus 122 includes a local interconnect (LIN) bus. In some examples, the MTM 120 is paired with a smartphone 130. The pairing process can manually or automatically be performed by an application on the smartphone 130. Typically, a manual pairing process includes triggering a pairing mode using a vehicle interface and selecting the vehicle on the smartphone 130 (or vice versa). Some pairing processes may further require the entry of a password or key during setup in either the vehicle 110 or the smartphone 130. Alternately, the key may be automatically retrieved from an online server.

Once paired, the MTM 120 is configured to selectively wirelessly transmit data to the smartphone 130 and receive data from the smartphone 130. The smartphone 130 is paired with the vehicle 110 or MTM 120 by an owner using a traditional pairing process.

The remote keyless system 112 further includes a plurality of slave transmitter modules (STs) 126-1, 126-2, 126-3, ..., and 126-N (collectively STs 126). The STs 126 include a wired transceiver for communicating with the vehicle communication bus 122 and a wireless transmitter for transmitting data to the smartphone 130 (rather than a wireless transceiver including both transmitter and receiver functionality). The MTM 120 may selectively wake up or shut down the STs 126 over the vehicle communications bus 122 as needed to reduce power consumption. In other words, the MTM 120 may shut down the STs 126 when the MTM 120 is not paired with a smartphone.

The STs 126 are arranged in various different locations of the vehicle 110. For example, STs 126-1 and 126-2 are arranged at opposite front sides of the vehicle 110, STs 126-5 and 126-N are arranged at opposite rear sides of the vehicle 110, and STs 126-3 and 126-4 are arranged at middle portions of the vehicle 110, although other ST arrangements can be used.

During use, the MTM 120 periodically advertises a network connection. When the smartphone 130 is within a predetermined vicinity of the vehicle (e.g. 70 m), the smartphone 130 receives the advertising message, pairs with the MTM 120 and a network connection is established. In some examples, the network connection is a Bluetooth low energy (BLE) connection.

In FIG. 4, different vehicle functions are enabled or disabled depending upon the location and proximity of the smartphone 130 relative to the vehicle. In some examples, the location and proximity of the smartphone 130 is classified into different zones located inside and outside of the vehicle 110. For example in FIG. 4, zones 1-4 are inside of the car and zones 5-10 are located outside. Certain vehicle functions are enabled when the smartphone 130 is located within a particular zone. For example, starting the ignition may be enabled when the smartphone is located within zones 1 and 2 and disabled otherwise. For example, unlocking the doors may be enabled when the smartphone 130 is located in zones 5, 6, 7 or 9.

To identify a location of the smartphone 130 relative to the vehicle 110, the MTM 120 sequentially sends instructions on the vehicle bus to each of the STs 126. The instructions command the STs 126 to sequentially transmit a message to the smartphone 130. In some examples, the message is a simulated or non-connectable BLE broadcast.

The smartphone 130 sequentially receives the messages from the STs 126, measures received signal strength (RSS) of the message and generates a response including an RSS indicator (RSSI) for the message. However, unlike the architecture in FIGS. 1 and 2, the STs 126 are unable to receive a response. The smartphone 130 sends the response over the BLE link to the MTM 120, which stores the RSSI for each of the STs 126. After the MTM 120 receives the RSSIs for all of the STs 126, the MTM 120 determines the location of the smartphone 130 relative to the vehicle based on the RSSIs and the known locations of the STs 126. The location can be determined based on relative RSSI strength and proximity based on RSSI magnitude. Alternately, the smartphone 130 can determine the location of the smartphone 130 relative to the vehicle based on the RSIs and the known location of the STs 126 and send the calculated location to the MTM 120.

For example, when the smartphone 130 is located adjacent to a driver side of the vehicle 110 about midway between the front and rear of the vehicle 110, the STMs 126-2 and 126-N will have RSSIs having approximately the same magnitudes $M_2$ and $M_N$, respectively. Likewise, the STMs 126-1 and 126-5 will also have similar (albeit lower) magnitudes $M_1$ and $M_5$, respectively. However, the magnitudes $M_2$ and $M_N$ will be higher due to the closer proximity of the smartphone 130 to the STMs 126-2 and 126-N as compared to the STMs 126-1 and 126-5. The MTM 120 identifies the location of the smartphone 130 to be between the STMs 126-1 and 126-2. The proximity is estimated based on the magnitude of the RSSIs. In this example, the smartphone may be located within zones 6, 7 or 8 depending on the magnitude of the RSSIs.

In other words, the MTM sequentially causes the STs to transmit messages to the smartphone. The MTM may generate a dedicated key for each ST for each transmission or the same key may be used for a predetermined number of successive transmissions. The STs package the key along with other data into a message and transmit the message in a BLE "false" dummy broadcast transmission. In some examples, the broadcast channel can be the same as that used by the MTM or the broadcast channel can be changed every transmission or every predetermined number of transmissions to protect against jamming or relay attacks.

Figure 5:
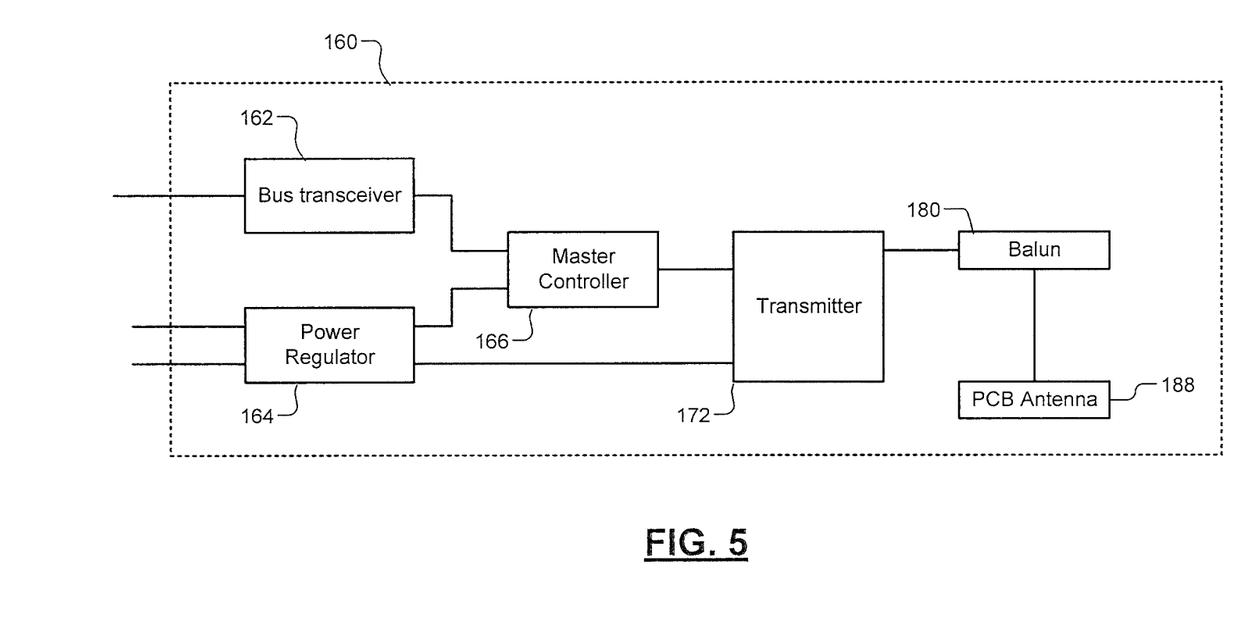
FIG. 5 is a functional block diagram of an example of an architecture for a slave transceiver module according to the present disclosure used in the system of FIG. 3.

Referring now to FIG. 5, an example of a circuit 160 that can be used for the ST 126 is shown. A bus transceiver 162 provides an interface to and from the vehicle bus 122. A power regulator 164 receives power from a vehicle power bus (not shown). An output of the bus transceiver 162 is input to a master controller 166. The master controller 166 receives messages from the MTM 120 and transmits messages to the smartphone 130. In some examples, the STs 126 do not include a wireless receiver (such as a Bluetooth receiver), do not require memory 78 such as EEPROM, and have a master controller 166 and a transmitter 172 with reduced instruction sets.

The master controller 166 communicates with the transmitter 172. In some examples, the master controller 166 prepares a message including security and an identification of the particular one of the STs 126 that generated the message. The transmitter 172 transmits data via a transmitter output circuit. In some examples, the transmitter output circuit includes a balun 180 and an antenna 188.

As can be appreciated, the MTM 120 and the STs 126 have different architectures. The MTM 120 may have the architecture shown in FIG. 2 whereas the STs 126 may have the architecture shown in FIG. 4. As a result, the cost of the keyless entry system can be significantly reduced since the STs 126 will have a lower cost.

Figure 6:
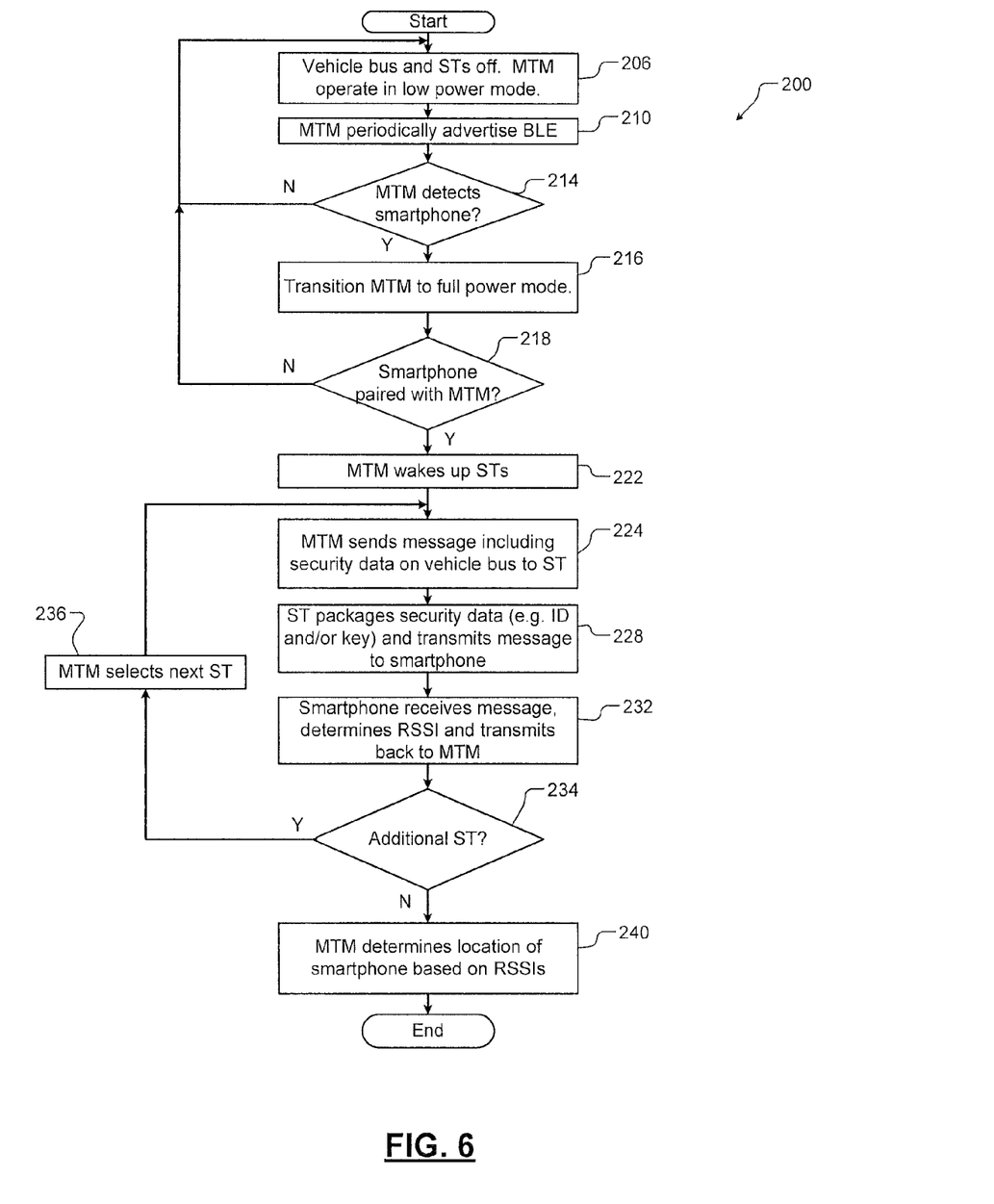
FIG. 6-8 are flowcharts of examples of a method for operating the remote keyless system of FIG. 3 according to the present disclosure.

Referring now to FIG. 6, a method 200 for operating the remote keyless system is shown. At 206, the vehicle bus and STs are off or the MTM is in a low power mode. At 210, the MTM periodically advertises the BLE network. At 214, the method determines whether the MTM detects a smartphone. If 214 is true, the MTM is transitioned to a full power mode at 216. At 218, the method detects whether the smartphone is paired with the vehicle. If either 214 or 218 are false, the method returns to 206.

If 218 is true, the MTM wakes up all of the STs 222 (or sequentially wakes up the STs). At 224, the MTM transmits a message to one of the STs. The message can include security data such as keys, rolling codes, etc. via the vehicle bus. The message can also include ST identification data, channel selection information, etc. In some examples, the identification data uniquely identifies the ST that sent the message.

At 228, the ST packages data such as the ID and the security data into a message that is transmitted to the smartphone. At 232, the smartphone receives the messages from the ST, generates an RSSI for the ST and transmits the RSSI back to the MTM. At 234, the method determines whether or not there are additional STs. If 234 is true, the method selects the next ST at 236 and continues at 224. When 234 is false, the MTM determines a location of the smartphone relative to the vehicle based on the RSSIs at 240.

Figure 7:
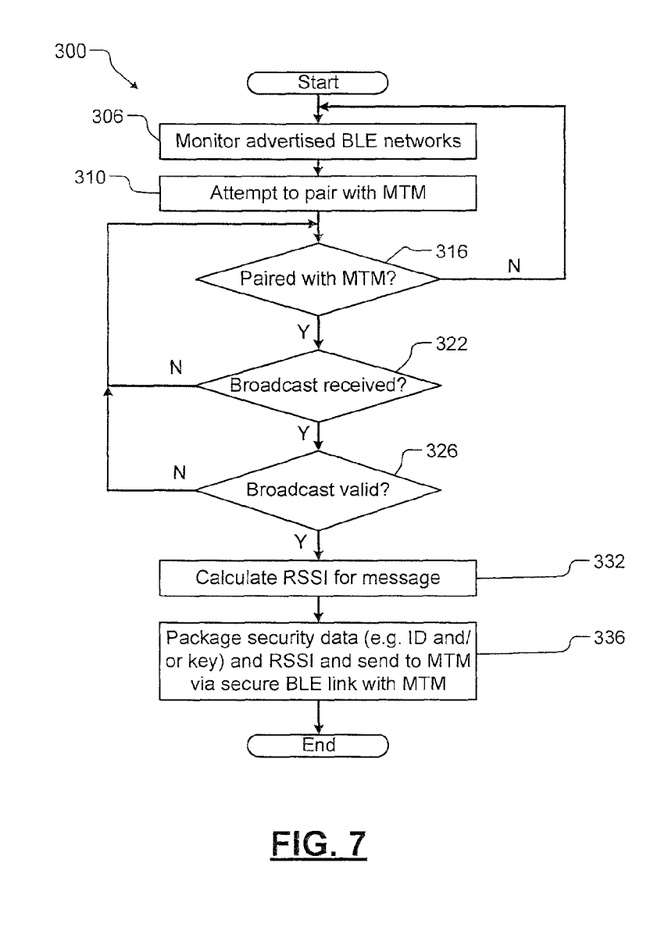

Referring now to FIG. 7, a method 300 for operating a smartphone is shown. At 306, the smartphone monitors advertised BLE networks. At 310, when the smartphone detects the BLE network advertised by the MTM, the smartphone attempts to pair with the MTM. At 316, the method determines whether the smartphone has paired with the MTM. If 316 is false, the method returns to 306. If 316 is true, the method continues at 322 and determines whether a broadcast message was received from one of the STs associated with the MTM.

If 322 is false, the method returns to 316. If 322 is true, the method continues with 326 and determines whether the broadcast message is a valid message by analyzing the security data such as the ID, key and/or rolling code. If 326 is false, the method returns to 316. If 326 is true, the method continues at 332 and the smartphone calculates the RSSI for the message. At 336, the smartphone packages the security data and RSSI into a message and sends the message to the MTM via the secure BLE link.

Figure 8:
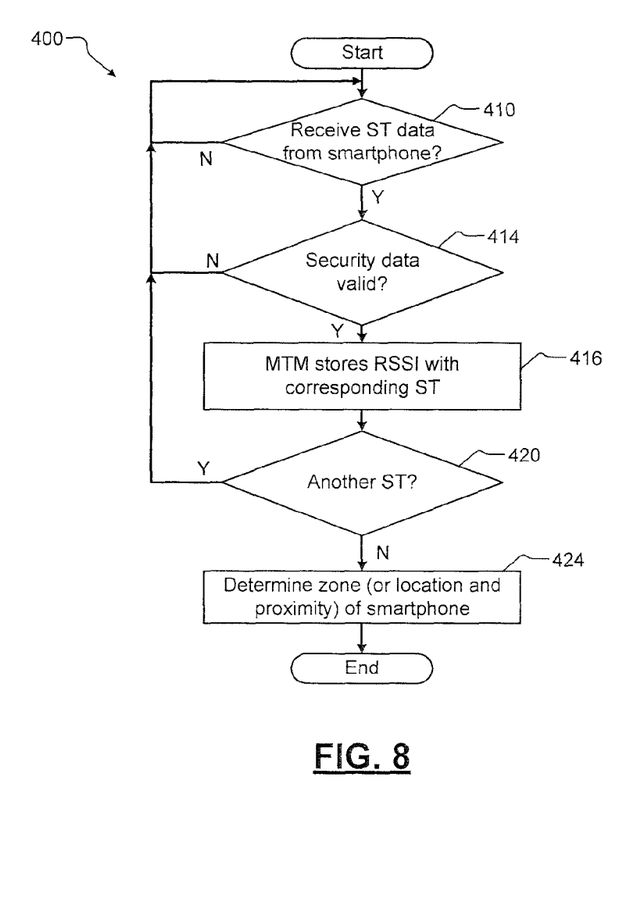

Referring now to FIG. 8, a method 400 for operating the MTM in response to receipt of messages from the smartphone relating to the STs is shown. At 410, the method determines whether the MTM has received ST message data from the smartphone. If 410 is true, the method continues with 414 and determines whether the security data is valid. If 414 is true, the MTM stores the RSSI with the corresponding ST identified in the message from the smartphone at 416. At 420, the method determines whether there is another ST for which the MTM has not received RSSI data. If 420 is true, the method returns to 410. When 420 is false, the MTM determines the zone (or location and proximity) of the smartphone at 424.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A remote keyless system for a vehicle, comprising:
a plurality of slave transmitter modules arranged in a plurality of locations in the vehicle; and
a master transceiver module configured to:
pair with a wireless device;
wirelessly transmit data to and receive data from the wireless device;
transmit first wired messages to the plurality of slave transmitter modules to send first wireless messages to the wireless device;
receive a plurality of second wireless messages directly from the wireless device, wherein the second wireless messages comprise data including received signal strength indicators (RSSIs) corresponding to each of the plurality of slave transmitter modules, respectively; and
determine a location of the wireless device relative to the vehicle based on the RSSIs in the plurality of second wireless messages.

2. The remote keyless system of claim 1, wherein the master transceiver module includes a wireless transceiver executing a wireless protocol.

3. The remote keyless system of claim 1, wherein the master transceiver module includes a wireless transceiver executing a Bluetooth low energy (BLE) stack.

4. The remote keyless system of claim 3, wherein the wireless transceiver transmits BLE compliant messages to the wireless device and receives BLE messages from the wireless device.

5. The remote keyless system of claim 1, wherein the master transceiver module is connected to a vehicle communication bus and wherein the vehicle communication bus comprises at least one of a local interconnect network (LIN) bus and a controller area network (CAN) bus.

6. The remote keyless system of claim 5, wherein the master transceiver module sequentially transmits the first wired messages on the vehicle communication bus to the plurality of slave transmitter modules.

7. The remote keyless system of claim 5, wherein the first wired messages transmitted by the master transceiver module to the plurality of slave transmitter modules include security data.

8. The remote keyless system of claim 7, wherein the security data includes a key and identification data for one of the plurality of slave transmitter modules.

9. The remote keyless system of claim 5, wherein the first wired messages transmitted by the master transceiver module to the plurality of slave transmitter modules include channel data specifying a channel to be used by the corresponding one of the plurality of slave transmitter modules.

10. The remote keyless system of claim 1, wherein the master transceiver module includes:
a wired bus transceiver that communicates with the plurality of slave transceiver modules;
a master controller in communication with the wired bus transceiver;
a wireless transceiver in communication with the master controller;
memory connected to the wireless transceiver; and
a transceiver output circuit connected to the wireless transceiver.

11. The remote keyless system of claim 10, wherein the transceiver output circuit includes:
a balun connected to an output of the wireless transceiver;
a filter directly connected to the balun; and
an antenna directly connected to the filter.

12. The remote keyless system of claim 11, wherein the slave transmitter module includes:
a wired bus transceiver that communicates with the master transceiver module;
a master controller in communication with the bus transceiver;
a transmitter in communication with the master controller; and
a transmitter output circuit.

13. The remote keyless system of claim 12, wherein the transmitter output circuit includes:
a balun connected to an output of the transmitter; and
an antenna directly connected to the balun.

14. The remote keyless system of claim 1, wherein the wireless device comprises a smartphone executing an application.

15. An apparatus to detect a location of a wireless device with respect to a vehicle, the apparatus comprising:
at least one memory comprising processor executable instructions; and at least one processor configured to read and execute the processor executable instructions, the processor executable instructions causing the at least one processor to:

control a plurality of slave transmitter modules to send first wireless messages to a wireless device;

receive at least one second wireless message directly from the wireless device, wherein the at least one second wireless message comprises data including received signal strength indicators (RSSIs) determined from the first wireless messages sent by the plurality of slave transmitter modules; and determine a location of the wireless device relative to the vehicle based on the RSSIs in the at least one second wireless message.

16. The apparatus of claim 15, wherein the at least one second wireless message comprises a Bluetooth low energy (BLE) compliant message.

17. The apparatus of claim 15, wherein the processor executable instructions cause the at least one processor to control the plurality of slave transmitter modules by sending at least one wired message across at least one from among a local interconnect network (LIN) bus and a controller area network (CAN) bus.

18. The apparatus of claim 15, wherein the wireless device comprises a smartphone executing an application.

19. The apparatus of claim 15, further comprising:
the plurality of slave transmitter modules arranged in a plurality of locations in the vehicle.

20. The apparatus of claim 19, further comprising:
a wired bus connecting the plurality of slave transmitter modules with the at least one processor.

* * * * *